(12) United States Patent
Beck

(10) Patent No.: US 10,780,526 B2
(45) Date of Patent: Sep. 22, 2020

(54) REMOTE LASER PROCESSING INSTALLATION AND METHOD OF OPERATING A REMOTE LASER PROCESSING INSTALLATION

(71) Applicant: Bayerische Motoren Werke Aktiengesellschaft, Munich (DE)

(72) Inventor: Stefan Beck, Kelheim (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 224 days.

(21) Appl. No.: 16/130,608

(22) Filed: Sep. 13, 2018

(65) Prior Publication Data
US 2019/0009363 A1    Jan. 10, 2019

Related U.S. Application Data

(63) Continuation of application No. PCT/EP2017/052132, filed on Feb. 1, 2017.

(30) Foreign Application Priority Data

Mar. 16, 2016   (DE) .................. 10 2016 204 345

(51) Int. Cl.
   *B23K 26/08*   (2014.01)
   *B23K 26/12*   (2014.01)
   *B23K 26/70*   (2014.01)

(52) U.S. Cl.
   CPC ........ *B23K 26/127* (2013.01); *B23K 26/0884* (2013.01); *B23K 26/706* (2015.10)

(58) Field of Classification Search
   CPC .......... B23K 26/02; B23K 26/08–0821; B23K 26/12; B23K 26/123–126; B23K 26/127–128
   See application file for complete search history.

(56) References Cited

U.S. PATENT DOCUMENTS 5,643,477 A    7/1997  Gullo et al.
7,238,916 B2*  7/2007  Samodell ............... B23K 9/323
                                                    219/125.1

(Continued)

FOREIGN PATENT DOCUMENTS

CN         103157922 A    6/2013
DE   10 2006 030 427 B3   1/2008

(Continued)

OTHER PUBLICATIONS

Chinese-language Office Action issued in Chinese Application No. 201780004908.1 dated Feb. 25, 2020 with English translation (16 pages).

(Continued)

*Primary Examiner* — Michael A Laflame, Jr.
(74) *Attorney, Agent, or Firm* — Crowell & Moring LLP

(57) ABSTRACT

A laser remote processing system, in particular a laser remote welding system, has a laser cell surrounded by a protective housing, in which a working robot having a remote laser tool and a first processing station in the working region of the working robot are arranged. In order to improve the efficiency of the system, a second processing station in the working region of the working robot, and at least one handling robot are furthermore arranged within the protective housing, it being possible to reposition workpieces between the first processing station or the second processing station and a buffer region with the handling robot. The buffer region is set up to receive workpieces and is integrated into the protective housing as an automatably actuable workpiece lock.

15 Claims, 2 Drawing Sheets

(56) References Cited

U.S. PATENT DOCUMENTS

| | | | | |
|---|---|---|---|---|
| 8,084,714 B2* | 12/2011 | Brauchle | ............. | B23K 37/006 219/121.86 |
| 10,086,471 B2* | 10/2018 | Mabee | ................. | B23K 26/083 |
| 10,391,597 B2* | 8/2019 | Mabee | ............... | B23K 26/0838 |
| 2002/0002418 A1 | 1/2002 | Pratt et al. | | |
| 2008/0052895 A1 | 3/2008 | Klemm | | |
| 2020/0016690 A1* | 1/2020 | Polk | .................... | B23K 26/362 |

FOREIGN PATENT DOCUMENTS

| | | |
|---|---|---|
| DE | 10 2010 042 777 A1 | 4/2012 |
| DE | 10 2015 211 925 A1 | 12/2016 |

OTHER PUBLICATIONS

International Search Report (PCT/ISA/210) issued in PCT Application No. PCT/EP2017/052132 dated Mar. 31, 2017 with English translation (seven pages).

German-language Written Opinion (PCT/ISA/237) issued in PCT Application No. PCT/EP2017/052132 dated Mar. 31, 2017 (six pages).

German-language Search Report issued in counterpart German Application No. 10 2016 204 345.5 dated Feb. 6, 2017 with partial English translation (12 pages).

Chinese-language Office Action issued in counterpart Chinese Application No. 201780004908.1 dated Jul. 1, 2019 with English translation (19 pages).

* cited by examiner

REMOTE LASER PROCESSING INSTALLATION AND METHOD OF OPERATING A REMOTE LASER PROCESSING INSTALLATION

CROSS REFERENCE TO RELATED APPLICATIONS

This application is a continuation of PCT International Application No. PCT/EP2017/052132, filed Feb. 1, 2017, which claims priority under 35 U.S.C. § 119 from German Patent Application No. 10 2016 204 345.5, filed Mar. 16, 2016, the entire disclosures of which are herein expressly incorporated by reference.

BACKGROUND AND SUMMARY OF THE INVENTION

The invention relates to a remote laser processing installation and to a method of operating a remote laser processing installation, in particular a remote laser welding installation.

In the case of remote laser-beam processing, a laser beam is directed onto a workpiece at a large working distance therefrom. Remote laser tools usually use scanner technology, by means of which the laser beam can be deflected in at least two axes. The large working distance means that even slight changes in angle give rise to a large amount of deflection of the laser beam on the workpiece, and this makes it possible to achieve high working speeds. These can be increased further by the remote laser tool being guided by an industrial robot, in particular a multi-axis industrial robot. The workpiece is positioned in a processing station, for processing purposes, and can be clamped and/or fixed in a suitable workpiece holder.

The multi-axis movement of such remote laser apparatuses, however, requires the area surrounding the laser radiation to be provided with particular protection. Therefore, remote laser processing installations are usually configured in the form of laser cells which are completely surrounded by a protective enclosure. The protective enclosure has the task of withstanding a beam which occurs, at least for a short period of time, in order to prevent the laser radiation from escaping in an uncontrolled manner, and the protective enclosure can be realized, for example, using passive or active protective walls. The remote laser tool and the working robot guiding the tool are arranged within the protective enclosure. A safety system guarantees that the laser processing can take place only when the protective enclosure is closed.

Further constituent parts of the installation, e.g. the laser source, which is coupled to the tool, and a control apparatus for controlling the installation, can likewise be provided outside the protective enclosure. Remote laser processing installations according to the preamble of patent claim 1 are generally known.

For operation of the installation, it is usually the case that the workpiece is moved through a closeable opening into the interior of the laser cell and, there, is moved to the processing station.

Safety systems ensure that laser processing can take place only when the protective enclosure is fully closed again. In practice, this results in long periods of downtime, during which the laser source and the remote tool are in standby. The laser source and processing optics are not utilized to the optimum extent and a further laser cell will be necessary in order to provide for high-volume production.

The object of the invention is to provide a remote laser processing installation, and a method of operating the same, which is improved in particular in respect of productivity.

This object is achieved by a remote laser processing installation, in particular a remote laser welding installation, having a laser cell, which is surrounded by a protective enclosure and in which are arranged a working robot, with a remote laser tool, and a first processing station in the working region of the working robot. In order to improve the productivity of the processing installation, also arranged within the protective enclosure are a second processing station in the working region of the working robot, and at least one handling robot, by which it is possible to reposition workpieces between the first processing station or the second processing station and at least one buffer region. The buffer region is intended to accommodate workpieces and is integrated, in the form of an automatable actuable workpiece airlock, in the protective enclosure.

According to the invention, the working robot can carry out the laser processing, e.g. welding or cutting, at one of the two processing stations while the handling robot is preparing the other processing station for subsequent processing, and is charging the same with a workpiece or moving an already processed workpiece into the buffer region. The buffer region, which is designed in the form of an airlock, means that the laser-processing procedure need not be interrupted in order for workpieces to be moved out of the laser cell or into the same. It is advantageously possible for workpiece processing to be carried out alternately at the first and second processing stations. The standstill periods or standby periods of the laser source can be reduced and the cycle time of the installation can be reduced in comparison with conventional remote laser installations. For example, the cycle time can be determined essentially by the processing time.

It is possible for the workpiece to comprise a single component or two or more components. The components are preferably sheet-metal components and, in particular, body-styling parts.

The buffer region serves for the interim storage of already processed or yet to be processed workpieces and can have for example appropriate workpiece holders. The design in the form of a workpiece airlock makes it possible for workpieces to be introduced into the laser cell, and discharged from the same, without it being possible for laser radiation to escape from the protective enclosure. The airlock can be actuated in an automatable manner and is preferably controlled by a central control apparatus of the remote laser processing installation, e.g. a programmable logic controller (PLC).

In a preferred configuration, the workpiece airlock is designed in the form of a linear airlock with an internal and external door located opposite one another. The workpieces negotiate the airlock by virtue of the internal door and external door being opened alternately. The internal door and external door are designed, for example, in the form of roller shutters.

In order to realize fully automatic process control, the remote laser processing installation, in one configuration, has at least one external handling robot, which is arranged outside the protective enclosure and by means of which workpieces can be removed from the workpiece airlock or can be moved into the same. It is also possible for the external handling robot to perform the task of transporting workpieces outside the laser cell from, or to, further processing installations or buffer systems, for example within a manufacturing system.

In order to optimize the assignment of workpieces to the processing stations and to shorten the distance of the transporting parts, one configuration has two, preferably spaced-apart, buffer regions provided in the remote laser processing installation, wherein a first buffer region is assigned to the first processing station and a second buffer region is assigned to the second processing station.

The amount of time required for component-handling processes can be reduced by the buffer region, in one configuration, having a first airlock chamber and second airlock chamber, which are spatially separate from one another and can be actuated independently of one another.

Preferably, each airlock chamber is designed in the form of an independent linear airlock. The processed workpiece can be introduced into one airlock chamber while the other airlock chamber already contains the workpiece which is to be processed subsequently.

In a preferred configuration, two handling robots are provided within the protective enclosure, wherein a first handling robot is assigned to the first processing station and to the first buffer region and the second handling robot is assigned to the second processing station and to the second buffer region. It is also the case that two external handling robots are arranged outside the protective enclosure, wherein a first external handling robot is assigned to the first buffer region and a second external handling robot is assigned to the second buffer region. The assignment of robots, buffer regions and processing stations to one another involves a common workpiece flow within the remote laser processing installation. In addition, it is possible for the corresponding components to be correspondingly assigned in spatial terms. This configuration provides, in particular, for two separate material flows through the first and second buffer regions. The resulting higher level of flexibility gives rise to good integration of the installation in existing production or manufacturing systems, e.g. a manufacturing line.

In one configuration, the remote laser processing installation is incorporated in at least one manufacturing line by the external handling robot or the external handling robots.

In one configuration, the handling robots and the working robot are multi-axis articulated robots with, for example, five or more axes and the handling robots additionally have a linear axis. The handling robots are intended to handle the workpieces and have, for example, a suitable gripping apparatus. The working robot processes workpieces by means of the laser tool arranged on its hand axis.

The remote laser processing installation can also have a beam source and a control apparatus for controlling the processing procedure. In one configuration, the control apparatus is intended, in terms of programming or circuitry, to control the operation of the installation such that, alternately, a laser-processing procedure is carried out at one of the processing stations while, at the same time, the other processing station is being prepared. For this purpose, in addition to the laser-processing procedure, the control apparatus can also control, for example, the robot movements and airlock doors.

In respect of the operation of a remote processing installation, the object of the invention is achieved by a method in the case of which, in a step a), workpiece processing is carried out at one of two processing stations within a protective enclosure of a laser cell using a working robot with a remote laser tool and, in a step b), the other processing station is prepared, using a handling robot, for subsequent workpiece processing, wherein the preparation of the other processing station comprises the steps of moving a previously processed workpiece from the other processing station into a buffer region which is integrated, in the form of an automatable actuable workpiece airlock, in the protective enclosure of the laser cell, and of moving from the buffer region to the other processing station a component which is to be processed. In order to improve the productivity of the installation, step b) is performed at the same time as step a) and steps a) and b) are carried out alternately for the first and second processing stations. In this context, at the same time means that the two steps take place at least to some extent in parallel, but should not be understood to mean that the two steps necessarily have to have the same duration or have to start or end at the same time.

In a preferred configuration, the method has the further step c) of re-charging the buffer region, for which reason the processed workpiece is discharged, and removed, from the protective enclosure and a workpiece which is to be processed is introduced into the protective enclosure. Step c) is performed after step b) and at the same time as step a). Step c) is preferably performed by at least one external handling robot, which is arranged outside the protective enclosure of the laser cell. Said robot removes a previously processed workpiece from the airlock and fills the airlock with a further workpiece.

In a preferred configuration, the method is implemented fully automatically, for which reason the installation has an appropriately set-up control apparatus. It is also possible to provide safety systems which ensure, e.g. by means of sensor monitoring, that the airlock doors can only be opened alternately.

Advantageously, just one laser cell is necessary, for which reason the remote laser processing installation according to the invention requires only a small amount of space and low-level investment costs. The installation and the method of operating the same utilize the beam source and processing optics or laser tool to best possible effect, as a result of which, over the service life of the installation, the maintenance and operating costs can be reduced.

The method is suitable, in particular, for operating the remote laser processing installation described above.

The properties, features and advantages of this invention described above, and the way in which these are achieved, become clearer and more readily comprehensible in conjunction with the following description of the exemplary embodiments. Where this application uses the term "can"/"possible", this relates both to the technical possibility and to the actual technical implementation.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
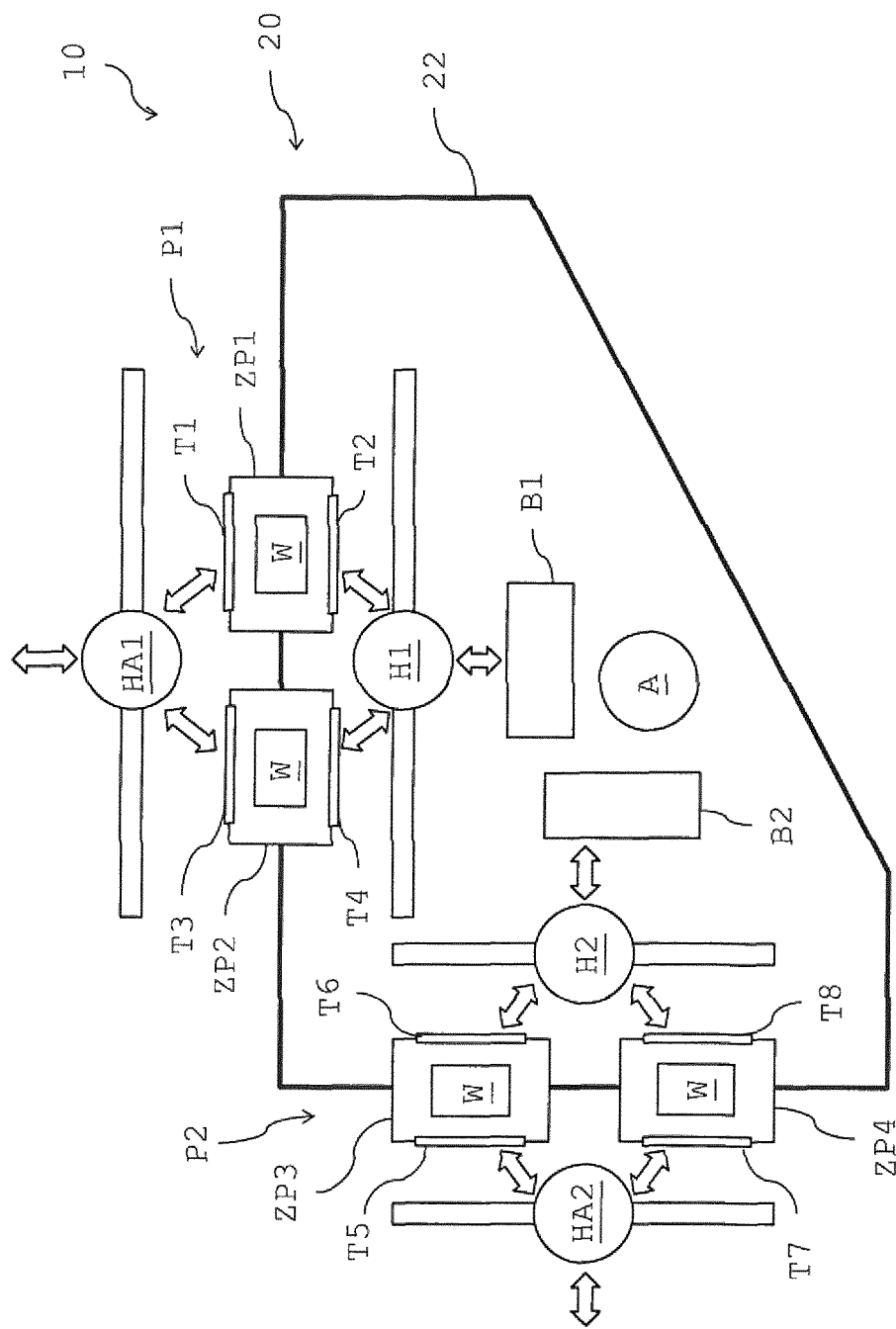
FIG. 1 is a schematic plan view of an exemplary remote laser processing installation.

FIG. 1 shows a remote laser processing installation 10 in the form of a remote laser welding installation, in which body-styling parts, e.g. doors or tailgates, are welded.

The remote laser processing installation 10 has a laser cell 20. In order to shield the surroundings against laser radiation which is emitted, or positioned incorrectly, in the interior of the laser cell 20, the latter is surrounded by a protective enclosure 22 designed in the form of a laser cabin.

The laser cell 20 contains a working robot A in the form of an articulated robot, which is mounted in a fixed position. The working robot welds the workpieces and, for this purpose, is equipped, on its hand axis, with a conventional scanner-based remote laser welding tool (not illustrated). The necessary laser radiation is generated by a laser source (not illustrated) outside the laser cell 20 and is coupled into the welding tool via suitable fiber-optic cables.

A first and second processing station B1 and B2, each in the form of a fixed-position table on which the workpieces can be positioned, and clamped and fixed by clamping means, are located in the working region of the working robot A. The processing stations B1 and B2 are spaced apart from one another, in order to reduce the number of those regions between the working spaces of the working robot A and of the handling robots H1 and H2 which are at risk of collision.

For the interim storage of the workpieces, the laser cell 20 has a first buffer region P1, with a first and second interim buffer ZP1 and ZP2, and a second buffer region P2, with a third and fourth interim buffer ZP3 and ZP4.

The buffer regions P1 and P2 are each integrated, in the form of a workpiece airlock, in the protective enclosure 22 of the laser cell 20. Each interim buffer ZP1, ZP2, ZP3 and ZP4 here is designed in the form of a linear airlock with an internal opening, which is directed toward the interior of the laser cell, and an external opening, which is directed outward into the surroundings of the laser cell. The openings can each be closed by doors T1 to T8 in the form of roller shutters. The wall of the interim buffers ZP1, ZP2, ZP3 and ZP4, and also the roller shutters, constitute part of the protective enclosure 22 of the laser cell 20 and, as such, meet the corresponding requirements relating to laser safety.

The material flow, i.e. the feed and discharge of workpieces W to and from the processing station, takes place on separate paths for the first processing station B1 and the second processing station B2.

For charging and emptying purposes, the first processing station B1 is assigned a first handling robot H1 within the laser cell 20, the first buffer region P1 and a first external handling robot HA1 outside the laser cell 20. Workpieces which are to be processed, or have been processed, at the first processing station B1 are removed from, and fed to, the first buffer region P1 by means of the first handling robot H1 and the first external handling robot HA1.

For charging and emptying purposes, the second processing station B2 is assigned a second handling robot H2 within the laser cell 20, the second buffer region P2 and a second external handling robot HA2 outside the laser cell 20. Workpieces which are to be processed, or have been processed, at the second processing station B2 are removed from, and fed to, the second buffer region P2 by means of the second handling robot H2 and the second external handling robot HA2.

The remote laser processing installation 10 is incorporated in a manufacturing line via the external handling robots HA1 and HA2. For this purpose, the external handling robots HA1 and HA2 can, for example, interact with other buffer systems or manufacturing apparatuses (not illustrated) and transfer, and receive, workpieces.

The handling robots H1, H2, HAL HA2 are each provided in the form of an at least five-axis articulated robot. In order to increase the amount of working space and to speed up handling, the handling robots H1, H2, HAL HA2 each additionally have a translator axis arranged along the associated buffer region P1, P2. The handling robots H1, H2, HAL HA2 are set up with a suitable gripping apparatus for handling the workpieces.

The installation 10 is controlled via a control apparatus (not illustrated) in the form of a programmable logic controller, which controls the robot movements, the airlock doors and the remote welding apparatus.

The double arrows in FIG. 1 indicate how the workpieces are moved within the processing installation. A detailed sequence will be described herein below with reference to the example shown in FIG. 2.

In the remote laser processing installation 10 illustrated in FIG. 1, it is preferably the case that identical workpieces W are processed at the two processing stations and the processing procedures at the two processing stations B1 and B2 are identical. As an alternative, it is possible for the installation illustrated, e.g. by use being made of component-specific gripping apparatuses and clamping apparatuses, to be used to process workpieces at the first processing station B1 which are different from those processed at the second processing station B2. It is likewise possible for the working robot A to carry out different processing procedures at the first and second processing stations.

Figure 2:
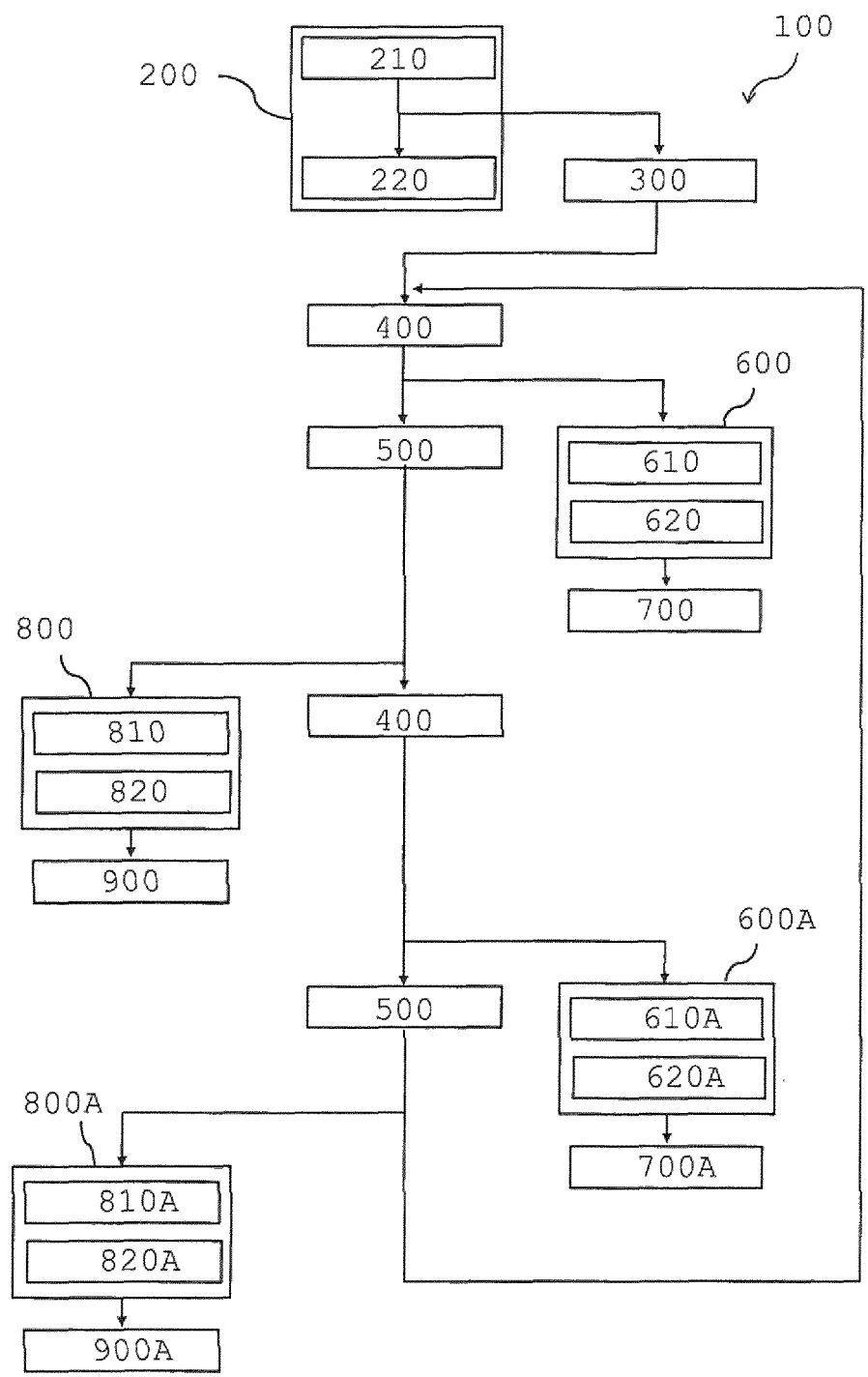
FIG. 2 is a flow chart for depicting an exemplary method of operating the remote laser processing installation.

FIG. 2 shows a flow diagram for depicting an exemplary process-control sequence.

The method 100 begins with the initial filling of the buffer regions P1 and P2 in step 200. For this purpose, in the first instance in step 210, the interim buffers ZP1 and ZP3 are filled, for which purpose the external roller shutter T1 of the interim buffer ZP1 and the external roller shutter T5 of the interim buffer ZP3 are opened, a workpiece W which is to be processed is set down in the interim buffer ZP1 by the external handling robot HAL a workpiece W which is to be processed is set down in the interim buffer ZP3 by the external handling robot HA2 and the roller shutters T1 and T5 are closed.

Then, in step 220, the interim buffers ZP2 and ZP4 are filled, for which purpose the external roller shutter T3 of the interim buffer ZP2 and the external roller shutter T7 of the interim buffer ZP4 are opened, a workpiece W which is to be processed is set down in the interim buffer ZP2 by the external handling robot HAL a workpiece W which is to be processed is set down in the interim buffer ZP4 by the external handling robot HA2 and the roller shutters T3 and T7 are closed.

The operation of filling the interim buffers ZP1 and ZP3 (step 210) is followed by the initial charging of the processing stations B1 and B2 with workpieces, illustrated as procedure section 300. For this purpose, the internal roller shutters T2 and T6 are opened, the first handling robot H1 removes from the interim buffer ZP1 the workpiece W previously set down there and the second handling robot H2 removes from the interim buffer ZP3 the workpiece W previously set down there. The roller shutters T2 and T6 are closed and the handling robots H1 and H2 set down the workpieces at the first and second processing stations B1 and B2, respectively. Step 300 takes place preferably at the same time as step 220.

Thereafter, in step 400, the working robot A performs a workpiece-processing procedure, e.g. a welding procedure, on the workpiece W in the first processing station B1.

At the end of step 400, that is to say following completion of the processing procedure at processing station B1, two further procedure steps are initiated.

On the one hand, in step 500, the working robot A turns toward the second processing station B2 and, there, performs a workpiece-processing procedure, e.g. a welding procedure.

On the other hand, in step 600, the first processing station B1 is prepared for a subsequent workpiece-processing procedure. Step 600 comprises two individual steps 610 and 620. In the first instance, in step 610, the previously processed workpiece is moved into the first buffer region P1. For this purpose, the first handling robot H1 removes the previously processed workpiece from the processing station B1, the internal roller shutter T2 opens, the handling robot H1 sets down the workpiece in the first interim buffer ZP1 and the roller shutter T2 closes. In the subsequent step 620, the first processing station B1 is charged, from the first buffer region P1, with a workpiece which is to be processed. For this purpose, the internal roller shutter T4 is opened, the handling robot H1 removes from the interim buffer ZP2 the workpiece which is to be processed, and sets the latter down in the first processing station B1, and the roller shutter T4 closes. This completes step 600.

At this point in time, the first interim buffer ZP1 has an already processed workpiece set down in it; the second interim buffer ZP2 is empty. In the subsequent step 700, the first buffer region P1 is re-charged. For this purpose, roller shutter T1 is opened, the external handling robot HA1 removes the processed component from the first interim buffer ZP1, and charges the first interim buffer ZP1 with a further workpiece which is to be processed, and roller shutter T1 closes. Interim buffer ZP2 remains empty.

Following step 500, two simultaneous procedure sections are initiated anew. On the one hand, the working robot A performs step 400 anew, i.e. it turns toward the first processing station B1 and, there, performs the workpiece-processing procedure.

On the other hand, steps 800 and 900 are performed. In step 800, the second processing station B2 is prepared for a subsequent workpiece-processing procedure. Step 800 comprises two individual steps 810 and 820. In the first instance, in step 810, the previously processed workpiece is moved into the second buffer region P2. For this purpose, the second handling robot H2 removes the previously processed workpiece from the processing station B2, the internal roller shutter T6 opens, the handling robot H2 sets down the workpiece in the third interim buffer ZP3 and the roller shutter T6 closes. In the subsequent step 820, the second processing station B2 is charged, from the second buffer region P2, with a workpiece which is to be processed. For this purpose, the internal roller shutter T8 is opened, the second handling robot H2 removes, from the fourth interim buffer ZP4, the workpiece which is to be processed, and sets the latter down in the second processing station B2, and the roller shutter T8 closes. This completes step 800.

At this point in time, the third interim buffer ZP3 has set down in it an already processed workpiece; the fourth interim buffer ZP4 is empty. In the subsequent step 900, the second buffer region P2 is re-charged. For this purpose, roller shutter T5 is opened, the second external handling robot HA2 removes the processed workpiece from the interim buffer ZP3, and charges the interim buffer ZP3 with a further workpiece which is to be processed, and roller shutter T5 closes. Interim buffer ZP4 remains empty.

Following step 400, two simultaneous procedure sections are initiated anew. On the one hand, the working robot A performs step 500 again, i.e. it turns toward the second processing station B2 and, there, performs the workpiece-processing procedure.

On the other hand, steps 600A and 700A are performed. In step 600A, the first processing station B1 is prepared for a subsequent workpiece-processing procedure. Step 600A comprises two individual steps 610A and 620A. In the first instance, in step 610A, the previously processed workpiece is moved into the first buffer region P1. Step 610A differs from step 610 in that the processed workpiece, rather than being set down in the first interim buffer ZP1, is set down in the second interim buffer ZP2, which at this point in time is still empty. For this purpose, the first handling robot H1 removes the previously processed workpiece from the processing station B1, the roller shutter T4 opens, the handling robot H1 sets down the workpiece in the second interim buffer ZP2 and the roller shutter T4 closes. In the subsequent step 620A, the first processing station B1 is charged with a workpiece which is to be processed. Step 620A differs from step 620 in that the workpiece, rather than being removed from the second interim buffer, is removed from the first interim buffer ZP1. For this purpose, the roller shutter T2 is opened, the handling robot H1 removes from the interim buffer ZP1 the workpiece which is to be processed, and sets the latter down in the first processing station B1, and the roller shutter T2 closes. this completes step 600A.

At this point in time, the interim buffer ZP2 has an already processed workpiece set down in it; interim buffer ZP1 is empty. In the subsequent step 700A, the first buffer region P1 is re-charged. For this purpose, roller shutter T3 is opened, the external handling robot HA1 removes the processed component from the second interim buffer ZP2, and charges the second interim buffer ZP2 with a further workpiece which is to be processed, and roller shutter T1 closes. Interim buffer ZP1 remains empty.

Following step 500, two simultaneous procedure sections are initiated anew. On the one hand, the working robot A performs step 400 again, i.e. it turns toward the first processing station B1 and, there, performs the workpiece-processing procedure.

On the other hand, steps 800A and 900A are performed. In step 800A, the second processing station B2 is prepared for a subsequent workpiece-processing procedure. Step 800A comprises two individual steps 810A and 820A. In the first instance, in step 810A, the previously processed workpiece is moved into the second buffer region P2. Step 810A differs from step 810 in that the processed workpiece, rather than being set down in the third interim buffer ZP3, is set down in the fourth interim buffer ZP4, which at this point in time is still empty. For this purpose, the second handling robot H2 removes the previously processed workpiece from the second processing station B2, the roller shutter T8 opens, the handling robot H2 sets down the workpiece in the fourth interim buffer ZP4 and the roller shutter T8 closes. In the subsequent step 820A, the second processing station B2 is charged with a workpiece which is to be processed. Step 820A differs from step 820 in that the workpiece, rather than being removed from the fourth interim buffer, is removed from the third interim buffer ZP3. For this purpose, the roller shutter T6 is opened, the handling robot H2 removes from the interim buffer ZP3 the workpiece which is to be processed, and sets the latter down in the second processing station B2, and the roller shutter T6 closes. This completes step 800A.

At this point in time, the interim buffer ZP4 has an already processed workpiece set down in it; interim buffer ZP3 is empty. In the subsequent step 900A, the second buffer region P2 is re-charged. For this purpose, roller shutter T7 is opened, the external handling robot HA2 removes the processed component from the interim buffer ZP4, and charges the interim buffer ZP4 with a further workpiece which is to be processed, and roller shutter T7 closes. Interim buffer ZP3 remains empty.

At this point in time of the sequence, the loading situation in the interim buffers is the same as after step 300. The procedure can be continued by ongoing repetition of the sequence described above from step 400, as illustrated in FIG. 2.

In this procedure, the processed workpieces are always placed in the same interim store from which they have also been removed for processing purposes. This simplifies assignment.

Steps 600 and 700 and also 600A and 700A take place at the same time as step 500, and steps 800 and 900 and also 800A and 900A take place at the same time as step 400, and this increases the fraction of processing time in relation to the overall cycle time of the installation 10. Unproductive periods of downtime are reduced, since workpiece handling takes place in parallel with the processing procedure. Advantageously, steps 600 and 700 and also 600A and 700A, together, require less time, or the same amount of time, as the processing procedure in step 500, and steps 800 and 900 and also 800A and 900A, together, require less time, or the same amount of time, as the processing procedure in step 400.

The exemplary embodiments are not true to scale and are non-limiting. Modifications which are common practice in the art are possible.

LIST OF REFERENCE SIGNS

| | |
|---|---|
| 10 | Remote laser processing installation |
| 20 | Laser cell |
| 22 | Protective enclosure |
| A | Working robot |
| B1, B2 | Processing station |
| H1, H2, HA1, HA2 | Handling robot |
| T1 to T8 | Doors |
| P1, P2 | Buffer regions |
| W | Workpiece |
| ZP1, ZP2, ZP3, ZP4 | Interim buffer |
| 100 to 900, 600A to 900A | Method steps |

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A remote laser processing installation, comprising:
a protective enclosure;
a laser cell, which is surrounded by the protective enclosure, wherein in the protective enclosure are arranged:
a working robot with a remote laser tool,
a first processing station in a working region of the working robot,
a second processing station in the working region of the working robot, and
at least one handling robot, by which it is possible to reposition workpieces between the first processing station or the second processing station and a buffer region,
wherein the buffer region is intended to accommodate workpieces and is integrated, in the form of an automatable actuable workpiece airlock, in the protective enclosure.

2. The remote laser processing installation as claimed in claim 1, wherein
the workpiece airlock is designed in the form of a linear airlock with an internal door and external door located opposite one another.

3. The remote laser processing installation as claimed in claim 1, further comprising:
at least one external handling robot, which is arranged outside the protective enclosure and by which workpieces are removable from the workpiece airlock or are movable into the same.

4. The remote laser processing installation as claimed in claim 1, wherein
two spaced-apart buffer regions are provided, wherein a first buffer region is assigned to the first processing station and a second buffer region is assigned to the second processing station.

5. The remote laser processing installation as claimed in claim 1, wherein
the buffer region has a first airlock chamber and a second airlock chamber, which are spatially separated from one another and are actuatable independently of one another.

6. The remote laser processing installation as claimed in claim 4, wherein
two handling robots are provided within the protective enclosure, wherein a first handling robot is assigned to the first processing station and to the first buffer region and the second handling robot is assigned to the second processing station and to the second buffer region, and
two external handling robots are arranged outside the protective enclosure, wherein a first external handling robot is assigned to the first buffer region and a second external handling robot is assigned to the second buffer region.

7. The remote laser processing installation as claimed in claim 6, wherein
the robots are multi-axis articulated robots and the handling robots additionally have a linear axis.

8. The remote laser processing installation as claimed in claim 1, wherein
the robots are multi-axis articulated robots and the handling robots additionally have a linear axis.

9. The remote laser processing installation as claimed in claim 1, further comprising:
a control apparatus that controls a laser-processing procedure so that, alternately, a laser-processing procedure is carried out at one of the processing stations while, at the same time, the other processing station is being prepared.

10. The remote laser processing installation as claimed in claim 3, wherein
the remote laser processing installation is incorporated in at least one manufacturing line by the external handling robot or the external handling robots.

11. The remote laser processing installation as claimed in claim 1, wherein
the installation is a remote laser welding installation.

12. A method of operating a remote laser processing installation, the installation comprising a protective enclosure; a laser cell, which is surrounded by the protective enclosure, wherein in the protective enclosure are arranged: a working robot with a remote laser tool, a first processing station in a working region of the working robot, a second processing station in the working region of the working robot, and at least one handling robot, by which it is possible to reposition workpieces between the first processing station or the second processing station and a buffer region, wherein the buffer region is intended to accommodate workpieces and is integrated, in the form of an automatable actuable workpiece airlock, in the protective enclosure, the method comprising the steps of:
a) carrying out workpiece processing at one of two processing stations within the protective enclosure of the laser cell using the working robot with the remote laser tool,
b) preparing the other processing station, using the handling robot, for subsequent workpiece processing, wherein the preparation of the other processing station comprises the steps of:
moving a previously processed workpiece from the other processing station into a buffer region which is integrated, in the form of an automatable actuable workpiece airlock, in the protective enclosure of the laser cell, and
moving from the buffer region to the other processing station a workpiece which is to be processed,
wherein step b) takes place at the same time as step a), and steps a) and b) are carried out alternately for the first and second processing stations.

13. The method as claimed in claim 12, further comprising the step of:
c) re-charging the buffer region,
wherein step c) is performed after step b) and at the same time as step a).

14. The method as claimed in claim 12, wherein
material flow to and from the first processing station is spatially separate from the material flow to and from the second processing station.

15. The method as claimed in claim 12, wherein the method is implemented fully automatically.

* * * * *